United States Patent
Suzuki

(10) Patent No.: US 6,270,439 B1
(45) Date of Patent: *Aug. 7, 2001

(54) HYDRAULIC PRESSURE CONTROL APPARATUS OF AUTOMATIC TRANSMISSION

(75) Inventor: Hosei Suzuki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/628,684

(22) Filed: Jul. 28, 2000

Related U.S. Application Data

(63) Continuation of application No. 09/215,130, filed on Dec. 18, 1998, now Pat. No. 6,139,459.

(30) Foreign Application Priority Data

Dec. 25, 1997 (JP) .................................... 9-358059

(51) Int. Cl.$^7$ ................................................ F16H 61/30
(52) U.S. Cl. ............................................................ 475/127
(58) Field of Search ................................ 475/118, 120, 475/121, 122, 123, 127; 477/127

(56) References Cited

U.S. PATENT DOCUMENTS

| | | | |
|---|---|---|---|
| 4,483,215 | 11/1984 | Ishimaru et al. | 475/284 |
| 4,726,261 | * 2/1988 | Kato et al. | 477/127 |
| 5,184,528 | 2/1993 | Mochizuki | 475/128 |
| 5,382,201 | 1/1995 | Izuka | 475/123 |
| 5,383,820 | 1/1995 | Mori | 475/123 |
| 5,411,446 | 5/1995 | Hirose | 475/120 |
| 5,441,459 | 8/1995 | Inukai et al. | 475/127 |
| 5,478,288 | 12/1995 | Sakakibara et al. | 475/120 X |
| 5,664,020 | 9/1997 | Kamada et al. | 475/127 X |
| 5,836,845 | 11/1998 | Sakaguchi et al. | 475/127 X |
| 5,857,935 | 1/1999 | Takiguchi | 475/120 |
| 5,938,563 | 8/1999 | Nishio et al. | 475/120 X |
| 6,139,459 | * 10/2000 | Suzuki | 475/127 |

FOREIGN PATENT DOCUMENTS

| | | |
|---|---|---|
| 0 537 818 | 4/1993 | (EP) . |
| 0 725 235 | 8/1996 | (EP) . |
| 7-269685 | 10/1995 | (JP) . |
| WO 94/15809 | 7/1994 | (WO) . |

* cited by examiner

*Primary Examiner*—Charles A Marmor
*Assistant Examiner*—Ankur Parekh
(74) *Attorney, Agent, or Firm*—Smith, Gambrell & Russell, LLP

(57) ABSTRACT

Hydraulic pressure regulated by a first pressure control valve is supplied to an electromagnetic changeover valve. The electromagnetic changeover valve changes over the hydraulic pressure between a low & reverse passage communicating with a low & reverse brake and a high clutch passage communicating with a high clutch, thereby a simultaneous engagement of the low & reverse brake and the high clutch can be avoided and further the simplification of the hydraulic control apparatus of an automatic transmission can be realized.

5 Claims, 5 Drawing Sheets

FIG. 3

| RANGE | GEAR | H/C 8 | R/C 9 | L/C 13 | 2&4/B 10 | L&R/B 15 |
|---|---|---|---|---|---|---|
| P | | | | | | |
| R | | | ● | | | ● |
| N | | | | | | |
| D | 1 | | | ● | | |
| | 2 | | | ● | ● | |
| | 3 | ● | | ● | ● | |
| | 4 | ● | | | ● | |
| 3 | 1 | | | ● | | |
| | 2 | | | ● | ● | |
| | 3 | ● | | ● | ● | |
| 2 | 1 | | | ● | | |
| | 2 | | | ● | ● | |
| | (3) | | | ● | | |
| 1 | 1 | | | ● | | ● |
| | (2) | | | | | |
| | (3) | | | | | |

● ENGAGED

HYDRAULIC PRESSURE CONTROL APPARATUS OF AUTOMATIC TRANSMISSION

CONTINUING APPLICATION DATA

This application is a continuation of U.S. patent application. No. 09/215,130, filed Dec. 18, 1998, now U.S. Pat. No. 6,139,459, issued Oct. 31, 2000. This parent application is entirely incorporated herein by reference.

BACKGROUND OF THE INVENTION

1. Field of the Invention

The present invention relates to an automatic transmission for an automobile and more particularly to a hydraulic control apparatus of an automatic transmission.

2. Prior Arts

Generally, in automatic transmissions for automobiles, gear ratios are automatically selected according to vehicle operating conditions such as engine load, vehicle speeds and the like and those gear ratios are obtained by selectively engaging friction elements such as clutches and brakes in automatic transmissions. In case of the automatic transmission employing a planetary gear for the transmission gear, the frictional engaging elements are composed of hydraulically controlled multiple disc clutches and hydraulic brakes.

The control of these friction elements is a key technology of the automatic transmission and many techniques have been proposed. Among them, Japanese Patent Application Lid-open (Unexamined Publication) No. Toku-Kai Hei. 7-269685, which has been proposed from the inventor of the present invention, discloses a so-called direct shift control method using pressure control valves provided in respective friction elements.

In the prior art, an electromagnetic type pressure control valve operated on forward running is provided on the friction elements, respectively and each of these pressure control valves performs a shift control based on an independent transient hydraulic characteristic so as to alleviate a shift shock and at the same time to shorten a shift time.

Further, Japanese Patent Application Laid-open No. Toku-Kai-Hei 7-269685 proposes a hydraulic control apparatus having two fail-safe valves for automatically avoiding such a hazardous condition as both low and reverse brake and overdrive clutch are simultaneously engaged when the gear is engaged in a first gear at "D" range.

However, the electromagnetic type pressure control valve is complicated in construction and therefore high in manufacturing cost. Furthermore, since one electromagnetic type pressure control valve must be provided for each of the frictional engaging elements, not only the total cost becomes high, but also the size of the apparatus increases.

Further, thefail-safevalvesproposedin Toku-Kai-Hei 7-269685 makes the hydraulic control system more complicated and increases the size and cost of the apparatus.

SUMMARY OF THE INVENTION

In view of the aforementioned problems, it is an object of the present invention to provide a low cost hydraulic control apparatus having a simple construction and small size of an automatic transmission.

The hydraulic apparatus comprises a first friction element engaged when a shift lever is positioned at "1" (first gear hold) range, a second friction element engaged when gearing of gear sets of a transmission is at a second gear position, a third friction element engaged when gearing of the gear sets is at a third gear position, a fourth friction element engaged when gearing of the gear sets is at least at a first gear position, a first pressure control valve for regulating a hydraulic pressure to be supplied to the first and third friction elements, respectively, a second pressure control valve for regulating a hydraulic pressure to be supplied to the second friction element, a reverse friction element engaged only when the select lever is positioned at "R" (reverse) range and a first hydraulic passage changeover valve provided between the first pressure control valve and the first and third friction elements for changing over hydraulic passages between the first friction element and the second friction element.

BRIEF DESCRIPTION OF THE DRAWINGS

FIG. 3 is a schedule showing the engaged and disengaged state of the clutches and brakes;

DETAILED DESCRIPTION OF PREFERRED EMBODIMENTS

Figure 1:
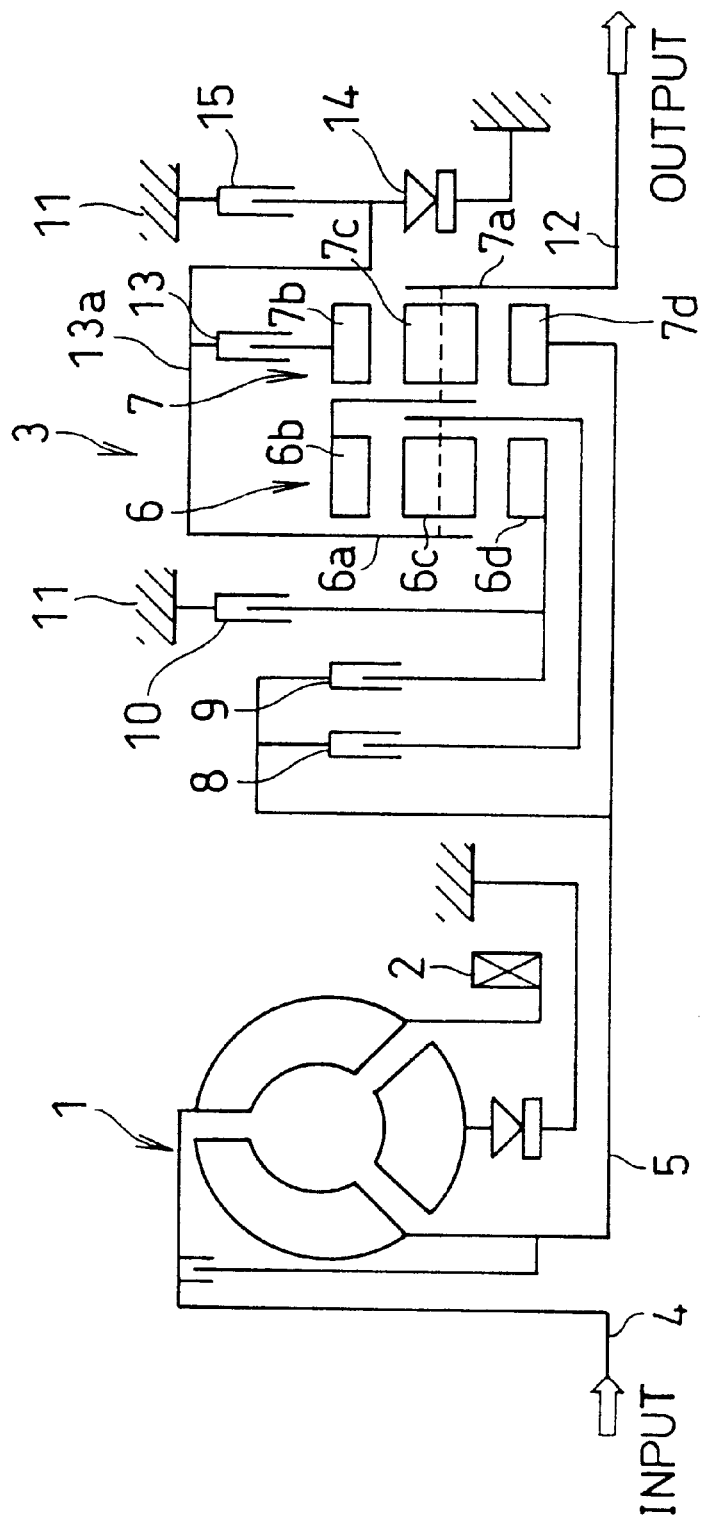
FIG. 1 is a schematic diagram showing a power transmission routing of an automatic transmission according to the present invention.

Referring now to FIG. 1, the driving force of the engine is inputted from an engine output shaft 4 and transmitted to an input shaft 5 of a multiple stage automatic transmission, i.e., in this embodiment a four speeds automatic transmission 3, through a torque converter 1 which drives an oil pump 2. The multiple stage transmission 3 comprises a front planetary gear set 6 and a rear planetary gear set 7. The front planetary gear set 6 is constituted by a planetary carrier 6a, a ring gear 6b, a pinion 6c and a sungear 6d and the rear clnetary gear set 7 is constituted by a planetary carrier 7a, a ring gear 7b, a pinion 7c and a sun gear 7d.

On the side of the front planetary gear set 6, a high clutch 8 as a third friction element, a reverse clutch 9 of a reverse friction element and a second and fourth (hereinafter referred to as 2 & 4) brake 10 of a second friction member are arranged in parallel. The high clutch 8 serves as engaging and disengaging power transmission between the input shaft 5 and the front planetary carrier 6a and the reverse clutch 9 serves as engaging and disengaging power transmission between the input shaft 5 and the front sun gear 6d. Further, the 2 & 4 brake 10 serves as engaging and disengaging between the front sun gear 6d and a transmission case 11 of the multiple stage automatic transmission 3.

The planetary carrier 7a of the rear planetary gear unit 7 rotates integrally with the ring gear 6b of the front planetary gear set 6, while being connected with an output shaft 12 of the automatic transmission 3.

Further, there is provided with a low clutch drum 13a around both planetary gear sets 6 and 7. The low clutch drum 13a rotates integrally with the front planetary carrier 6a, while being connected with a low one-way clutch 14. Further, there is provided with a low clutch 13 as a fourth friction element which serves as engaging and disengaging between the low clutch drum 13a and the ring geer 7b of the rear planetary gear set 7.

Furthermore, on the side of the rear planetary gear set 7, there is provided with the low one-way clutch 14 for engaging and disengaging between the planetary carrier 6a of the front planetary gear set 6 and the transmission case 11 and also there is provided with a low and reverse (hereinafter referred to as L & R) brake 15 as a first friction element for preventing the idle rotation of the low one-way clutch 14.

Thus constituted multiple stage automatic transmission 3 has four forward speed ratios and a reverse speed ratio and these speed ratios are suitably selected by engaging or disengaging the aforesaid friction elements, the high clutch 8, the reverse clutch 9, the low clutch 13, the 2 & 4 brake 10 and the L & R brake 15.

FIG. 3 is a schedule showing a state of engaging or disengaging these clutches and brakes on shifting.

Figure 2:
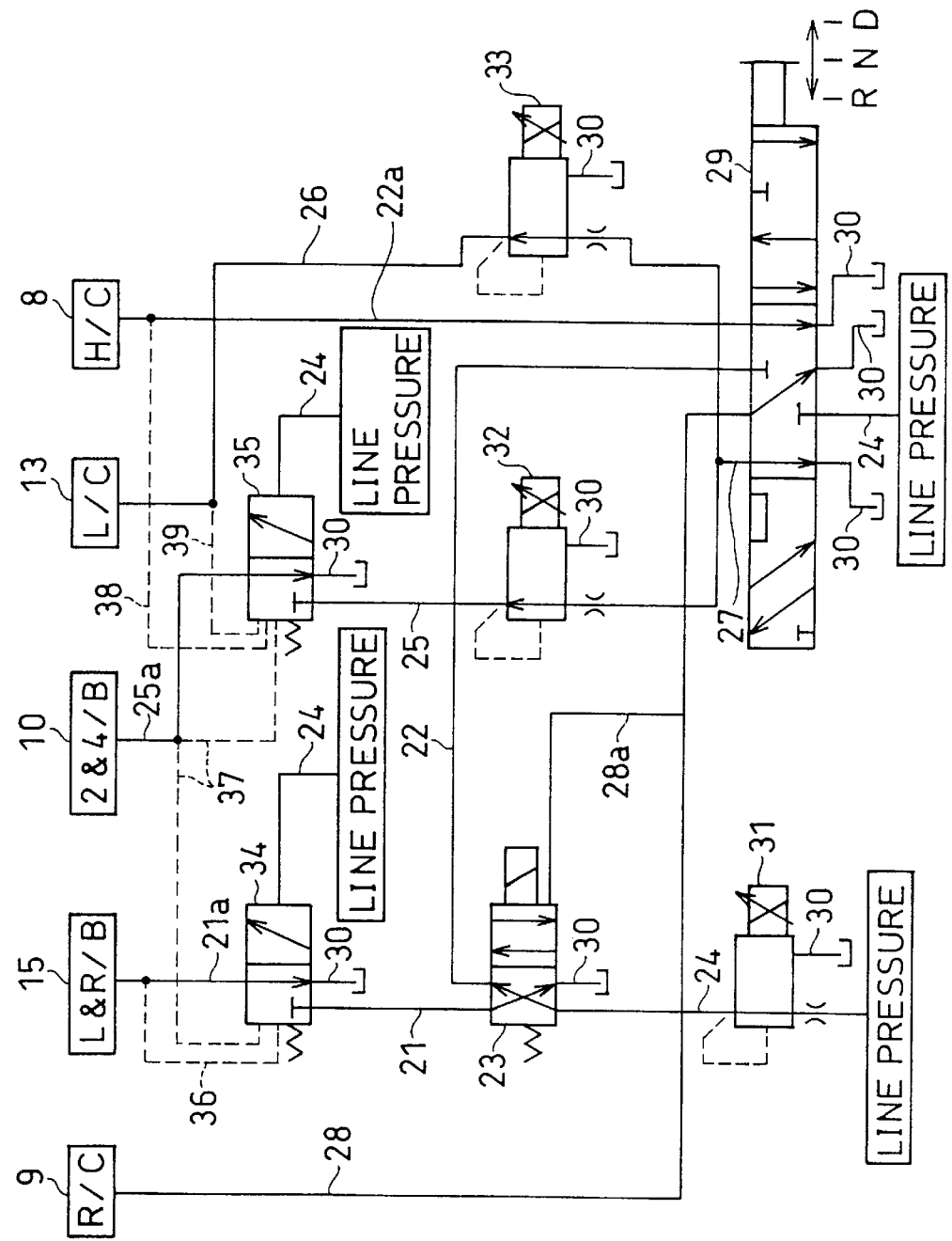
FIG. 2 is a schematic diagram showing a hydraulic control circuit of an automatic transmission according to the present invention.
Figure 4:
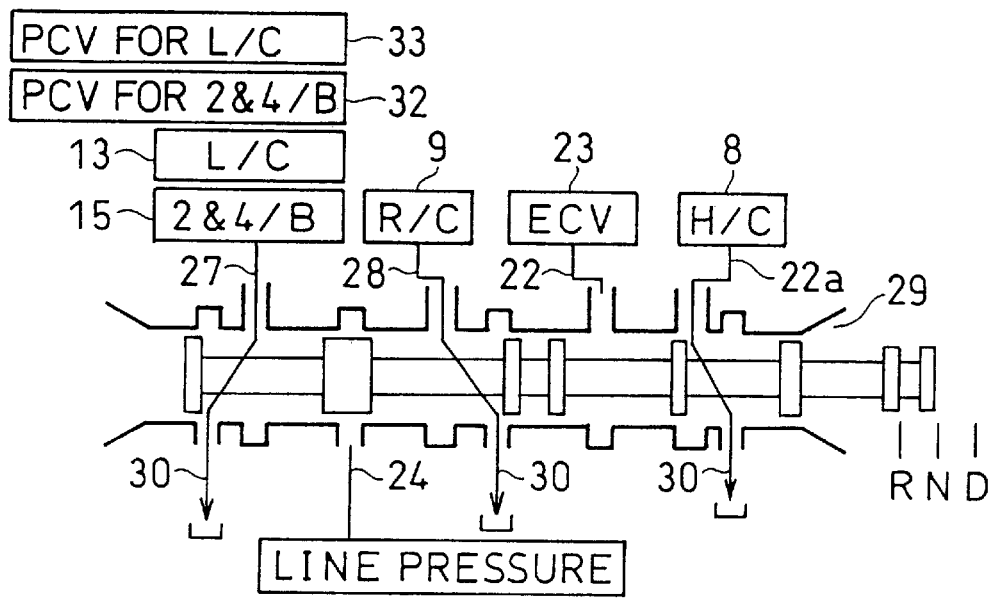
FIG. 4 is a schematic diagram showing the operating state of a manual valve when "N" range is selected.

Referring to FIG. 2, an L & R brake passage 21 connected to the L & R brake 15 and a high clutch passage 22 connected to the high clutch 8 are connected with a line pressure passage 24 respectively through an electromagnetic changeover valve 23 of a first oil passage changeover valve. Further, a line pressure PL supplied from the oil pump 2 and regulated into a proper pressure value according to vehicle operating conditions is applied to the electromagnetic changeover valve 23.

Further, a 2 & 4 brake passage 25 connected to the 2 & 4 brake 10 and a low clutch passage 26 connected to the low clutch 13 are combined at an oil passage 27. This oil passage 27 and a reverse clutch passage 28 connected to the reverse clutch 9 are connected with a manual valve 29 which is interconnected with a select lever (not shown). The high clutch passage 22 is connected with the manual valve 29 so as to be communicated or disconnected with the high clutch 8.

When the select lever is positioned at "N (neutral)" range as shown in FIG. 2, the high clutch passage 22 and a line pressure passage 24 are shut of and at the same time the oil passages 27, 28 and a high clutch passage 22a connected with the high clutch 8 communicate with a drain passage 30 respectively. When the select lever is positioned at "P (parking)" range, the hydraulic circuit has same connections as in "N" range.

On the other hand, when the select lever is positioned at "D (drive)" range, the high clutch passage 22 communicates with the high clutch 8 and the line pressure passage 24a communicates with the oil passage 27. Further, the reverse clutch 9 is retained being connected with the drain passage 30. When the select lever is positioned at "3 (third)", "2 (second)" or "1 (first gear hold)" range, the hydraulic circuit has the same connections as in "D" range.

When the select lever is positioned at "R (reverse)" range, the reverse clutch passage 28 is connected with the line pressure passage 24 and at the same time the oil passages 27, 22a are connected with the drain passage 30.

Further, the electromagnetic changeover valve 23 serves as changing over the oil passage by the energizing or deenergizing operation of a solenoid. At the normal positing with the solenoid deenergized, as shown in FIG. 2, an offset spring urges a spool of the electromagnetic changeover valve 23 to oress in the right direction in the drawing and as a result the line pressure passage 24 communicates with the high clutch passage 22 and the L & R brake passage 21 communicates with the drain passage 30.

When the solenoid of the electromagnetic changeover valve 23 is energized, the spool travels in the left direction in the drawing against the biasing force of the offset spring. As a result, the line pressure passage 24 communicates with the L & R brake passage 21 and at the same time the high clutch passage 22 communicates with the drain passage 30.

When the select lever is positioned at "D", "3", or "2" range, the electromagnetic changeover valve 23 is in the normal condition with the solenoid deenergized and when the select lever is positioned at "R", "N", "P" or "1" range, the solenoid is energized.

As described above, since the L & R brake 15 is engaged only when the select lever is positioned at "R" or "1" range and the high clutch 8 is engage only when the select lever is positioned at "3" or "4" range, the L & R brake 15 and the high clutch 8 are never engaged concurrently. Thus, by selectively changing over the connection between the L & R brake passage 21 and the line pressure passage 24 to or from the connection between the high clutch passage 22 and the line pressure passage 24 through the electromagnetic changeover valve 23, it becomes possible to control the high clutch 8 and the L & R brake 15 separately using a common component and as a result it is possible to save the number of components.

Further, in case the solenoid is not operated for some reason, a fail-safe passage 28a connected to the reverse clutch passage 28 is connected with the solenoid side of the electromagnetic changeover valve 23.

Further, the oil passages 24, 25 and 26 are provided with a first pressure control valve 31, a second pressure control 16 valve 32 and a third pressure control valve 33, respectively. These pressure control valves 31 through 33 constitute a so-called direct shift control in which the L & R brake 15, the 2 & 4 brake 10, the low clutch 13 and the high clutch 8 are able to be independently controlled with a different operation pressure characteristic. Also, these control valves 31 through 33 are constituted by a linear solenoid control valve in this embodiment but the linear solenoid control valve may be replaced with other control valves such as a duty solenoid valve or a pressure reducing valve using a pilot pressure controlled by a duty solenoid valve.

Further, the oil passages 21, 25 are provided with a L & R fail-safe valve 34 which is a second changeover valve and a 2 & 4 fail-safe valve 35 which is a third changeover valve, respectively.

These fail-safe valves 34, 35 serve as a limp-home means for supplying operating pressure to each of the friction elements 15, 10, 13, 8, even when the pressure control valves 31, 32, 33 have failures and pressure supply therefrom is stopped.

The L & R fail-safe valve 34 has an offset spring on an offset surface of a spool on the left side of the drawing. Further, the L & R fail-safe valve 34 is connected on the offset surface side of the spool with a L & R brake pressure detecting passage 36 as a first detecting means and a 2 & 4 brake pressure detecting passage 37 as a second detecting means, respectively. Further, the L & R fail-safe valve 34 is connected on a line pressure receiving surface on the right side of the spool with the line pressure passage 24.

In a normal condition where the line pressure PL is not supplied to the line pressure passage 24, the spool is pressed in the right direction of the drawing by the biasing force of the offset spring to shut off the L & R brake passage 21 and at the same time to interconnect the oil passage 21a connected to the L & R brake 15 with the drain passage 30.

When the line pressure PL is applied, the spool travels in the left direction of the drawing against the biasing force of the offset spring to open the L & R brake passage 21. At this moment, when an operating pressure is supplied to both brakes 10, 15 due to an failure of at least either of the pressure control valves 31, 32, the spool of the L & R fail-safe valve 34 travels in the right direction of the drawing to shut off the L & R brake passage 21 and at the same time to drain the operating pressure supplied to the L & R brake 15. As a result, the L & R brake 15 is released.

The 2 & 4 fail safe valve 35 serves as a limp-home means in case the pressure control valves 31, 32 33, when the select lever is set to "D" range, are inoperative and the output pressure generates from all of these control valves 31, 32, 33.

The 2 & 4 fail safe valve 35 has an offset spring on an offset surface of a spool on the left side of the drawing. Further, the 2 & 4 fail safe valve 35 is connected on the offset surface side of the spool with a 2 & 4 brake detecting passage 37, a high clutch pressure detecting passage 38 as a third detecting means, and a low catch pressure detecting passage 39 as a fourth detecting means, respectively. Further, the 2 & 4 fail safe valve 35 is connected on a line pressure receiving surface on the right side of the spool with the line pressure passage 24.

In a normal condition where the line pressure PL is not supplied to the line press-re passage 24, the spool is pressed in the right direction of the drawing by the biasing force of the offset spring to shut off the 2 & 4 brake passage 25 and at the same time to interconnect the oil passage 25a connected to the 2 & 4 brake 10 with the drain passage 30.

When the line pressure PL is applied, the spool travels in the left direction of the drawing against the biasing force of the offset spring to open the 2 & 4 brake passage 25. At this moment, when the select lever is set to "D" range with the pressure control valves 31, 32, 33 not energized and with the output pressure of these control valves retained respectively, an operating pressure is supplied to the 2 & 4 brake 10, the low clutch 13 and the high clutch 8, respectively. Then, each operating pressure is applied to the offset surface of the 2 & 4 fail safe valve 35 through the respective detecting passages 37, 38, 39. As a result, the spool travels in the right direction of the drawing to shut off the 2 & 4 brake passage 25 and at the same time to drain the operating pressure supplied to the 2 & 4 brake 10, thereby this 2 & 4 brake 10 is released and the transmission gear is limp-formed at the 3rd gear.

A description will now be given to the operation of thus constituted hydraulic control apparatus. When the engine starts, the oil pump 2 is driven and a line pressure PL regulated by a pressure regulating valve (not shown) is applied to the line pressure receiving surface of the respective fail-safe valves 34, 35. Then, the spools of the fail-safe valves 34, 35 travel in the left direction of the drawing against the biasing force of the offset springs to open the respective oil passages 21, 25.

At this time, when the select lever is positioned at "N" range, the electromagnetic changeover valve 23 is turned ON to move the spool in the left direction of the drawing and the L & R brake passage 21 communicates with the line pressure passage 24. Then, at the same time, the high clutch passage 22 communicates with the drain passage 30.

Further, in this condition, the oil passages 28, 25, 26, 22a except the L & R brake passage 21 are connected with the drain passage 30 to release the reverse clutch 9, the 2 & 4 brake 10, the low clutch 13 and the high clutch 8. On the other hand, an operating pressure is supplied to the L & R brake 15 through the line pressure passage 24 and the L & R brake passage 21. This operating pressure is regulated into a small (pre-loaded) pressure by the first pressure control valve 31 in order to secure the responsibility when the select lever is shifted from "N" range to "R" range.

When the select lever is positioned at "D" range, the solenoid of the electromagnetic changeover valve 23 is turned OFF to communicate the L & R brake passage 21 with the drain passage 30 and at the same time to communicate the line pressure passage 24 with the high clutch passage 22. As a result, the operating pressure supplied to the L & R brake 15 is discharged and the regulated operating pressure is supplied to the high clutch passage 22.

Figure 5:
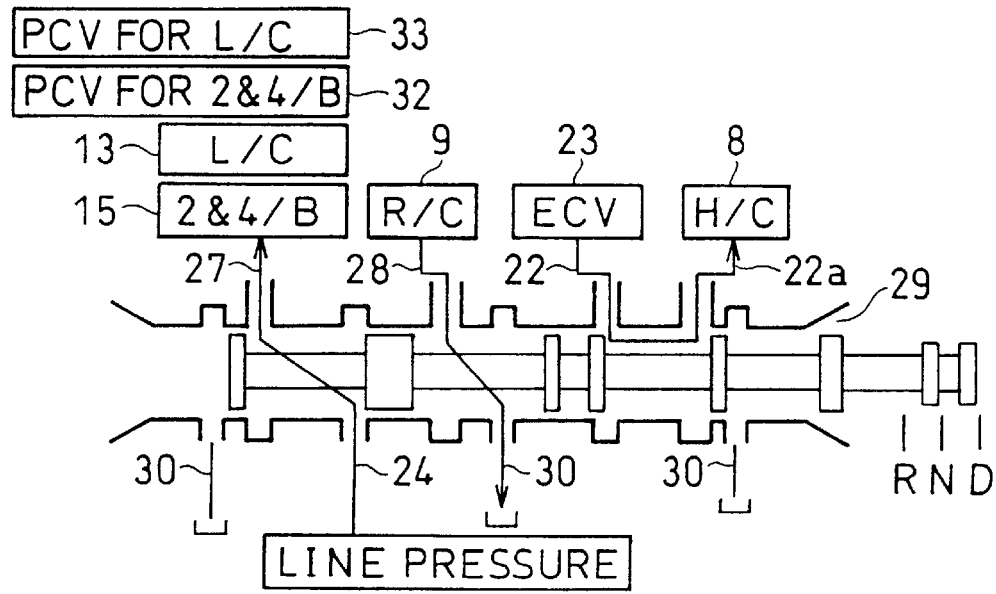
FIG. 5 is a schematic diagram showing the operating state of a manual valve when "D" range is selected.

FIG. 5 shows a state of the spool of the manual valve 29 positioned at "D" range. In this state, the line pressure 24 is connected with the oil passage 27 and as a result the line pressure PL is supplied to both the 2 & 4 brake passage 25 and the low clutch passage 26. Further, in this state, the reverse clutch passage 28 is connected with the drain passage 30 to discharge the operating pressure supplied to the reverse clutch 9 and further the high clutch passage 22 communicates with the oil passage 22a to supply the regulated operating pressure to the high clutch 8.

On the other hand, the line pressure PL supplied through the oil passage 27 is sent to the 2 & 4 brake passage 25 and the low clutch passage 26, respectively. The respective line pressure is controlled into a specified operating pressure by the pressure control valves 32, 33 and sent to the 2 & 4 brake 10 and the low clutch 13, respectively.

That is, in the pressure control valves 31, 32, 33, the respective operating pressure is controlled according to transient characteristics which are programmed based on engine loads, vehicle speeds and the like. The high clutch 8, the 2 & 4 brake 10 and the low clutch 13 are engaged or disengaged according to the schedule as shown in FIG. 3 to select an optimum gear ratio.

In case where those pressure control valves 31, 32, 33 can not be energized due to failures and as a result the output pressure is generated therefrom, the operating pressure supplied to the brake 10, the clutches 13 and 8 is applied to the offset surface of the 2 & 4 fail-safe valve 35 through the detecting passages 37, 38, 39 and as a result the spool of the 2 & 4 fail-safe valve 35 travels in the right direction of the drawing against the line pressure PL applied to the line pressure surface on an opposite side, thereby the 2 & 4 brake passage 25 is shut off and at the same time the oil passage 25a connected on the 2 & 4 brake 10 side communicates with the drain passage 30 to discharge the operating pressure supplied to the 2 & 4 brake 10.

On the other hand, since the low clutch 13 and the high clutch 8 are retained in the engagement state, the transmission gear is fixed at the 3rd gear as shown in FIG. 3 and a limp-home at the 3rd speed is secured.

Further, when the select lever is positioned at "D" range and when the electromagnetic changeover valve 23 can not be switched OFF, therefore, the L & R brake passage 21 is kent connected to the line pressure passage 24, and further when both pressure control valves 31, 32 are held open due to failures, the operating pressure supplied to the L & R brake 15 and the 2 & 4 brake 10 is applied to the offset surface of the L & R fail-safe valve 34, as a result the spool of the L & R fail-safe valve 34 travels in the right direction of the drawing against the line pressure PL applied on the opposite side to shut off the L & R brake passage 21 and at the same time to communicate the oil passage 21a on the L & R brake is side with the drain passage 30, thereby the operating pressure supplied to the L & R brake 15 is discharged and the L & R brake 15 is released.

As a result, the 2 & 4 brake 10 is engaged and the transmission gear is fixed at the 2nd gear to secure a limp-home at the 2nd speed.

Further, when the select lever is positioned at "R" range, the electromagnetic changeover valve 23 is turned ON to connect the L & R brake passage 21 with the line pressure passage 24 and at the same time to connect the high clutch passage 22 with the drain passage 30.

Figure 6:
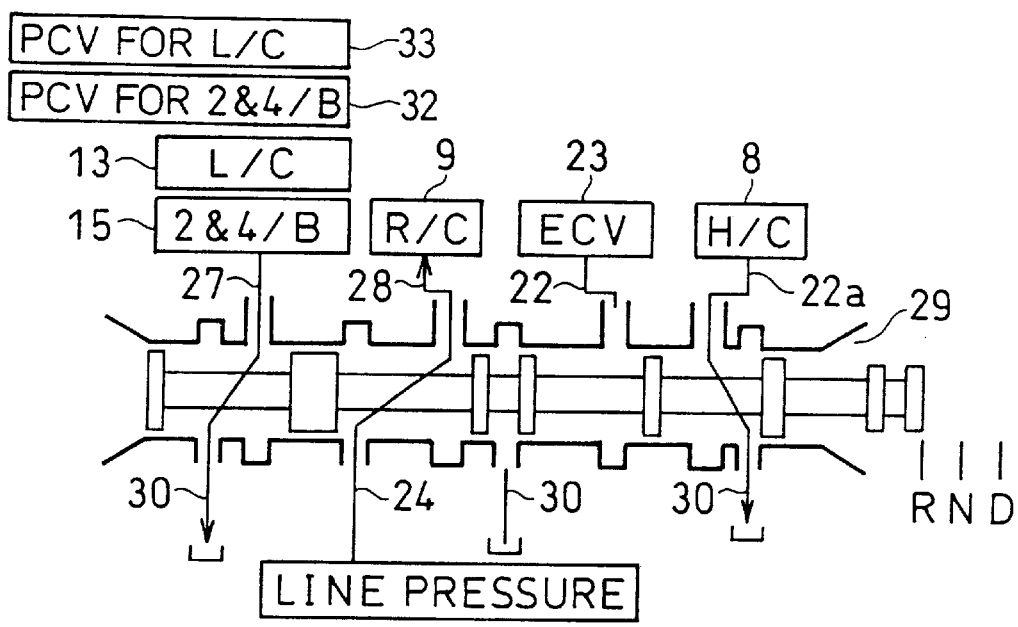
FIG. 6 is a schematic diagram showing the operating state of a manual valve when "R" range is selected.

In this state, as shown in FIG. 6, the oil passage 27 is connected with the drain passage 30 to release the operating pressure supplied to the low clutch 13 and the 2 & 4 brake 10. Further, the high clutch passage 22 is shut off and at the same time the oil passage 22a connected to the high clutch 8 side of the high clutch passage 22 is connected with the drain passage 30 to discharge the operating pressure supplied to the high clutch 8, thereby the high clutch 8 is released. Further, at the same time, the line pressure passage 24 is connected with the reverse clutch passage 28 to engage the reverse clutch 9.

At this moment, even in case where the solenoid of the electromagnetic changeover valve 23 is not energized due to failures, since the pressure receiving surface on the solenoid side is connected with the oil passage 28a divided from the reverse clutch passage 28, the spool travels after some delay by the biasing force of the line pressure PL to change over the electromagnetic changeover valve 23, thereby the engagement of the L & R brake 15 is secured.

For example, in case where the select lever is shifted to "1" range during running at the 4th gear of "D" range or during running at "3" range, i.e., in case of a so called "jump-shift", even the electromagnetic changeover valve 23 operates normally, it is difficult to make a transient control simultaneously, when the high clutch 8 is released and at the same time the L & R brake 15 is engaged by the first pressure control valve 31.

Therefore, in case of a "jump-shift", a sequential shift is performed in such a manner as 4th/⇒3rd/⇒2nd/⇒1st or 3rd/⇒2nd/⇒1st. For example, even in case where the shift lever is swiftly shifted from 4th gear of "D" range or "3" range directly to "1" range, the operating pressure supplied to the high clutch 8 is controlled by the first control valve 31 without operating the electromagnetic changeover valve during shifting from 4th gear to 2nd gear or 3rd gear to 2nd gear. As a result, it is possible to control the transient characteristic of the L & R brake 15 and the low clutch 13 smoothly with only one pressure control valve.

Thus, according to the embodiment of the present invention, since the engagement of the L & R brake 15 and the disengagement of the high clutch 8 are controlled with one pressure control valve 31 by changing over the oil passage of the electromagnetic changeover valve 23, the expensive pressure control valve can be replaced with the relatively inexpensive electromagnetic changeover valve, the total cost of the apparatus can be reduced and further the overall size of the apparatus can be decreased.

Further, even when the electromagnetic changeover valve 23 is not energized for some reason, since the line pressure PL supplied from the oil passage 28a changes over the electromagnetic changeover valve 23, that is, the electromagnetic changeover valve 23 shares a part of the fail-safe function, the construction of the L & R fail-safe valve 34 can be simplified, thereby the manufacturing cost of the apparatus can be reduced.

While the presently preferred embodiment of the present invention has been shown and described, it is to be understood that this disclosure is for the purpose of illustration and that various changes and modifications may be made without departing from the scope of the invent on as set forth in the appended claims.

What is claimed is:

1. A hydraulic control apparatus of a multiple speed ratio automatic transmission having an input shaft from an engine, an output shaft and gear sets interposed between said input and output shafts and adapted to provide a plurality of speed ratios, said hydraulic control apparatus including friction elements selectively operative to establish said plurality of speed ratios, a shift lever manually operated by a driver and a manual valve interconnected with said shift lever for engaging or disengaging said friction elements, the improved apparatus comprising:

a first friction element engaged when said shift lever is positioned at "1" (a first gear hold) range;

a second friction element engaged when gearing of said gear sets is at a second gear position;

a third friction element engaged when gearing of said gear sets is at a third gear position;

a fourth friction element engaged when gearing of said gear sets is at least at a first gear position;

a first pressure control valve for regulating a hydraulic pressure to be supplied to said first and third friction elements;

a second pressure control valve for regulating a hydraulic pressure to be supplied to said second friction element;

a reverse friction element engaged only when said shift lever is positioned at an "R" (reverse) range; and an electromagnetic hydraulic passage changeover valve provided between said first pressure control valve and said first and third friction elements for selectively changing over hydraulic passages between said first friction element and said third friction element, said electromagnetic hydraulic passage changeover valve having a spool integrated with a solenoid.

2. The apparatus according to claim 1, wherein:

when said shift lever is positioned at the "R" range, hydraulic pressure is applied to said first hydraulic passage changeover valve, which causes the first pressure control valve to communicate with the first friction element.

3. The apparatus according to claim 1, wherein the first, the second, and the third friction elements are operable using only said first and second pressure control valves.

4. The apparatus according to claim 1, wherein the first friction element communicates with the first pressure control valve through said first hydraulic passage changeover valve when said shift lever is positioned at "R" (reverse) or "1" range.

5. A hydraulic control apparatus of a multiple speed ratio automatic transmission having gear sets adapted to provide a plurality of speed ratios, said hydraulic control apparatus including friction elements selectively operative to establish said plurality of speed ratios, a shift lever manually operated by a driver and a manual valve interconnected with said shift lever for engaging or disengaging said friction elements, the improved apparatus comprising:

a first friction element engaged when said shift lever is positioned at "1" (a first gear hold) range;

a second friction element engaged when gearing of said gear sets is at a second gear position;

a third friction element engaged when gearing of said gear sets is at a third gear position;

a fourth friction element engaged when gearing of said gear sets is at least at a first gear position;

a first pressure control valve for regulating a hydraulic pressure to be supplied to said first and third friction elements;

a second pressure control valve for regulating a hydraulic pressure to be supplied to said second friction element;

a reverse friction element engaged only when said shift lever is positioned at an "R" (reverse) range; and an electromagnetic hydraulic passage changeover valve provided between said first pressure control valve and said first and third friction elements for selectively changing over hydraulic passages between said first friction element and said third friction element, wherein the hydraulic pressure supplied to said first, second, and third friction elements is regulated using only said first and second pressure control valves.

* * * * *